Oct. 14, 1952  C. J. LACHER  2,613,847
LUGGAGE CONTAINER
Filed June 17, 1949

INVENTOR.
Carl John Lacher
BY
Woodling and Krost
his Attnys.

Patented Oct. 14, 1952

2,613,847

UNITED STATES PATENT OFFICE 2,613,847

LUGGAGE CONTAINER

Carl John Lacher, Cleveland, Ohio

Application June 17, 1949, Serial No. 99,666

1 Claim. (Cl. 220—94)

My invention relates in general to luggage units and in particular to a handle adapted to be fastened onto a luggage container. Previous to this time, ropes or flexible cords have been laced through openings in paper bags to form handles for shopping bags. Many different boxes have also been equipped with a bendable handle or flexible cord which was woven in and out through openings in the walls of the box to hold the lids on or to serve as handles. However, no one has used a handle which could be quickly and easily fastened to the container without threading the cord through a lot of openings in the walls of the container.

Therefore, one of the objects of my invention is to provide a handle for a container wherein the handle may be quickly and easily fastened to the container.

Another object of my invention is to provide a luggage container with a handle cord arranged to support the container and the contents thereof and also provide carrying loops upon opposite sides thereof.

Another object of my invention is to provide a container with a handle wherein a handle cord is extended across the bottom and along opposite side walls of the container with fasteners extending through the walls and engaging the cord to hold it in a definite position on the container.

Another object of my invention is to provide fasteners for holding a handle cord on a luggage container.

Other objects and a fuller understanding of the invention may be had by referring to the following description and claim, taken in conjunction with the accompanying drawings, in which:

Figure 1:
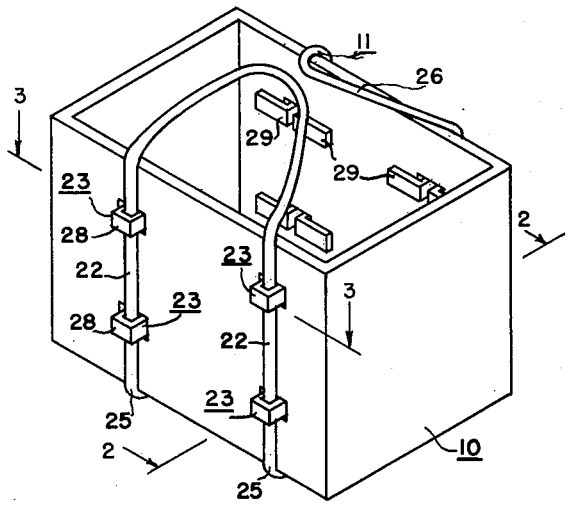
Figure 1 is an oblique view of my luggage container equipped with my easily attached handle.
Figure 3:
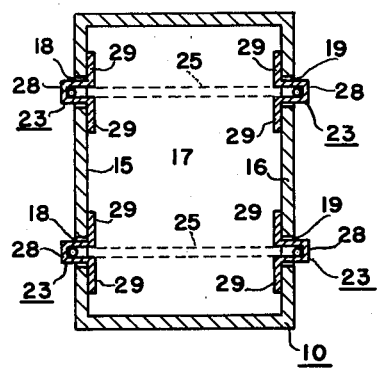
Figure 3 is a cross sectional view taken along the line 3—3 of Figure 1.
Figure 2:
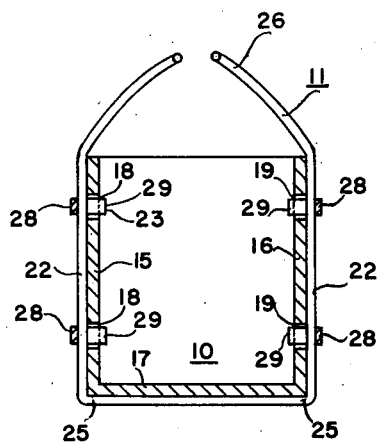
Figure 2 is a cross sectional view taken along the line 2—2 of Figure 1.

The luggage unit, the preferred embodiment of which I have illustrated and described herein, generally comprises a container 10 having a supporting handle 11. The container 10 as is best illustrated in Figures 2 and 3 is constructed from opposite side walls 15 and 16, respectively, and a bottom 17. These opposite side walls 15 and 16 have holes or openings 18 and 19, respectively, therein. In Figure 1, I illustrate that the wall 15 has a plurality of openings 18 with the openings 18 aligned in spaced rows extending from the bottom of the box toward the top or open end thereof. The holes or openings 19 in the side wall 16 are similarly spaced.

The handle 11 has a handle cord 22 extendable along the side walls and across the bottom of the container 10. This handle cord 22, when positioned against the side walls 15 and 16, crosses the openings 18 and 19. The handle cord may be constructed of rope, webbing or any other suitable material which may be extended around the container and arranged to support the load and thereby reinforce the container. I have designated the handle cord 22 as having a supporting portion 25 which engages the side walls and the bottom of the container, and as having carrying loops 26 which extend above the container upon opposite sides thereof and at the mouth thereof.

The handle cord 22 is held in definite position on the container by fasteners 23, best illustrated in Figure 3. These fasteners 23 engage the side walls 15 and 16 of the container and also the supporting portion 25 of the handle cord 22. The fasteners 23 may be constructed of plastic spring material or other suitable materials. Each fastener 23 is described as having a cord engagement portion 28 and wall engagement portions 29. In my drawings I have illustrated the cord engagement portion 28 as being substantially U-shaped, with the free ends of the legs of the U forming the wall engagement portions 29. The cord engagement portion 28 extends through the openings in the wall and about the support portion 25 of the handle cord 22. The wall engagement portions 29 extend outwardly from the opening and engage the inner surface of the side wall of the container to prevent the fastener pulling out through the opening.

In attaching my handle to the box the handle cord 22 is slipped under the box and laid along the side walls 15 and 16. The cord may be looped and these loops inserted through the openings in the side walls of the container. The fasteners 23 are then inserted between the loops and the side walls and the cord pulled tight, thus again returning the cord to the outside of the box and pulling the cord engagement portions 28 through the openings. By using these fasteners 23 I have eliminated the necessity of lacing a long handle cord through a plurality of openings in the walls of the container.

Figure 4:
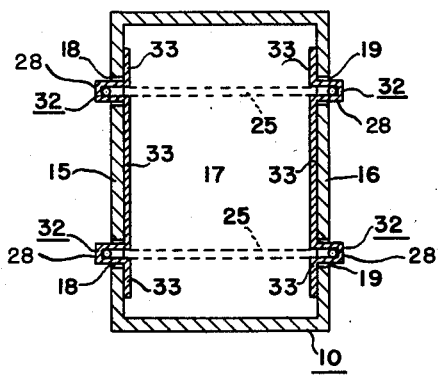
Figure 4 is a cross sectional view the same as that of Figure 3 but illustrating a modified fastener for holding the cord in a definite position on the walls of the container.

In Figure 4 of my drawings I illustrate the combining of two fasteners into a single fastener 32. This single fastener 32 has a cord engagement portion 28 on each end thereof and wall engagement portions on each end thereof, and also a wall engagement portion 33 extending between the cord engagement portions 28. The single fastener 32 is used in the same manner as the fasteners 23 but is designed to hold the cord in two places instead of one place. The fastener 32 is slipped under the cord 22 when the cord is pushed through the openings in the side walls in the same manner as the fasteners 23.

My new handle is quickly and easily attachable to a container having opposite side walls with openings therein. The handle may be removed at any time by removing the fasteners so that the cord can be slipped off the box or container. These handles, including the nonending cords and the fasteners, may be packaged as a unit and put in ordinary merchandise shipping boxes. After the merchandise has been removed from the box in a store, the store owner may easily and quickly attach the handle to the box, thus converting a useless box into a convenient luggage container for his customers.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A container and handle with the handle movably and removably attached to said container, said container having a bottom and opposite side walls with at least one opening therein, said handle being a movable and removable endless cord arranged to support the container and provide carrying loops at the top of opposite sides of the container, said cord extending in two generally parallel paths substantially vertically along the side walls and across beneath the bottom of the container at spaced intervals along the side walls and bottom, and cord fasteners removable from the complete container and removably extendable through the spaced openings in the side walls at spaced locations along the cord, each cord fastener having a U-shaped mid-portion and first and second side legs extending substantially perpendicularly away from said mid-portion, said opening being large enough to pass said U-shaped mid-portion and two thicknesses of said cord, the U-shaped mid-portion of a cord fastener being loosely mounted through said opening from the inside of the container with the cord engaging the U-shaped mid-portion and with said first and second side legs engaging the inside surface of the side wall next adjacent the opening, said cord holding said mid-portion of said fastener in place in said opening and preventing the removable fastener from passing inwardly through the opening while the handle is being used yet permitting ready removal of both cord fastener and cord.

CARL JOHN LACHER.

REFERENCES CITED

The following references are of record in the file of this patent:

UNITED STATES PATENTS

| Number | Name | Date |
|---|---|---|
| 462,541 | Evans et al. | Nov. 3, 1891 |
| 851,595 | Howell | Apr. 23, 1907 |
| 974,217 | Wagner | Nov. 1, 1910 |
| 1,069,649 | Rothschild | Aug. 5, 1913 |
| 1,305,198 | Deubener | May 27, 1919 |
| 1,512,228 | Mannocci | Oct. 21, 1924 |
| 1,927,706 | House | Sept. 19, 1933 |
| 2,047,095 | Booth | July 7, 1936 |

FOREIGN PATENTS

| Number | Country | Date |
|---|---|---|
| 43,693 | France | May 7, 1934 |
| 131,476 | Switzerland | May 1, 1929 |